(12) United States Patent
Patel et al.

(10) Patent No.: US 8,310,189 B2
(45) Date of Patent: Nov. 13, 2012

(54) POSITION SENSORLESS CONTROL OF PERMANENT MAGNET MOTORS

(75) Inventors: Nitinkumar R. Patel, Cypress, CA (US); Yo Chan Son, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 505 days.

(21) Appl. No.: 12/558,257

(22) Filed: Sep. 11, 2009

(65) Prior Publication Data

US 2011/0062909 A1    Mar. 17, 2011

(51) Int. Cl.
*H02P 6/18* (2006.01)
(52) U.S. Cl. .............................. 318/400.32; 318/400.02
(58) Field of Classification Search ............. 318/400.02, 318/400.32
See application file for complete search history.

(56) References Cited

U.S. PATENT DOCUMENTS

| 4,468,599 | A | * | 8/1984 | Berman et al. | 318/362 |
| 5,097,190 | A | * | 3/1992 | Lyons et al. | 318/701 |
| 5,107,195 | A | * | 4/1992 | Lyons et al. | 318/701 |
| 5,903,129 | A | * | 5/1999 | Okuno et al. | 318/721 |
| 6,646,409 | B2 | * | 11/2003 | Won et al. | 318/701 |
| 6,894,454 | B2 | | 5/2005 | Patel et al. | |

* cited by examiner

*Primary Examiner* — Bentsu Ro
(74) *Attorney, Agent, or Firm* — Ingrassia Fisher & Lorenz, P.C.

(57) ABSTRACT

Methods and apparatus are provided for sensorless control of a permanent magnet motor. The method includes the step of determining a sensorless position signal and a sensorless speed signal in a torque-speed plane in response to phase currents corresponding to currents on one or more of the plurality of phases.

6 Claims, 6 Drawing Sheets

POSITION SENSORLESS CONTROL OF PERMANENT MAGNET MOTORS

TECHNICAL FIELD

The present invention generally relates to electric motor systems, and more particularly relates to a method and apparatus for position sensorless control of a permanent magnet synchronous electric motor.

BACKGROUND OF THE INVENTION

To improve transmission operation, a hydraulic system including an auxiliary electric transmission fluid pump is provided for circulating transmission fluid in transmission columns. The transmission hydraulic system circulates the transmission fluid for both lubricating and cooling the transmission. In addition, the transmission hydraulic system establishes pressure within the automatic transmission to hold the clutches. It is desired that the auxiliary electric transmission fluid pump be provided as part of a high performance auxiliary electric motor system. The auxiliary transmission pump motor will be a part of the transmission system and may normally be submerged in the transmission fluid. However, conventional electric motor systems require a resolver sensor and associated signal digitizing circuitry to sense rotor position and rotor angular velocity for operation of permanent magnet synchronous electric motor. Such circuitry entails additional costs, additional wiring connected to the motor, and diminishes the performance of the electric motor system. In addition, submerging the rotor sensing circuitry in the fluid with the electric pump motor is problematic.

Accordingly, it is desirable to provide a robust and cost effective method and apparatus for sensorless operation of a permanent magnet synchronous motor in an electric motor system suitable for an auxiliary transmission pump motor system which reduces the number of wires connected to the motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for sensorless control of a permanent magnet motor including a plurality of phases. The method includes the step of determining a sensorless position signal and a sensorless speed signal in a torque-speed plane in response to phase currents corresponding to currents on one or more of the plurality of phases.

In addition, an electric motor system is provided. The electric motor system includes a permanent magnet motor, an inverter, a controller, and a sensorless position and speed estimator. The permanent magnet motor includes a plurality of phases. The inverter generates a plurality of phase signals in response to modulated control signals and is coupled to the permanent magnet motor for providing each of the plurality of phase signals to a corresponding one of the plurality of phases of the permanent magnet motor. The controller generates the modulated control signals in response to a sensorless position signal, a sensorless speed signal and phase current signals, the phase current signals corresponding to currents on one or more of the plurality of phases. The sensorless position and speed estimator generates the sensorless position signal and the sensorless speed signal in a torque-speed plane in response to the phase current signals.

Further, a vehicle is provided, the vehicle including a transmission, one or more transmission fluid columns and an electric transmission fluid pump. The transmission controls the movement of the vehicle. The one or more transmission fluid columns retain transmission fluid and the transmission is submerged in the transmission fluid within the one or more transmission fluid columns. The electric transmission fluid pump pumps the transmission fluid through the one or more transmission fluid columns when activated and includes a permanent magnet motor, an inverter, a controller, and a sensorless position and speed estimator. The permanent magnet motor includes a plurality of phases and the inverter is coupled to the permanent magnet motor for providing each of a plurality of phase signals to a corresponding one of the plurality of phases of the permanent magnet motor, the inverter generating the plurality of phase signals in response to modulated control signals. The controller generates the modulated control signals in response to a sensorless position signal, a sensorless speed signal and phase current signals, the phase current signals corresponding to currents on one or more of the plurality of phases. And the sensorless position and speed estimator generates the sensorless position signal and the sensorless speed signal in a torque-speed plane in response to the phase current signals. The permanent magnet motor is submerged in the transmission fluid within the one or more transmission fluid columns and the inverter is located outside the one or more transmission fluid columns and coupled to the permanent magnet motor by a plurality of phase wires for providing the phase signals thereto, each of the plurality of phase wires corresponding to one of the plurality of phases of the permanent magnet motor. The controller and the sensorless position and speed estimator are also located outside the one or more transmission fluid columns and coupled to the phase wires for receiving the phase currents therefrom.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
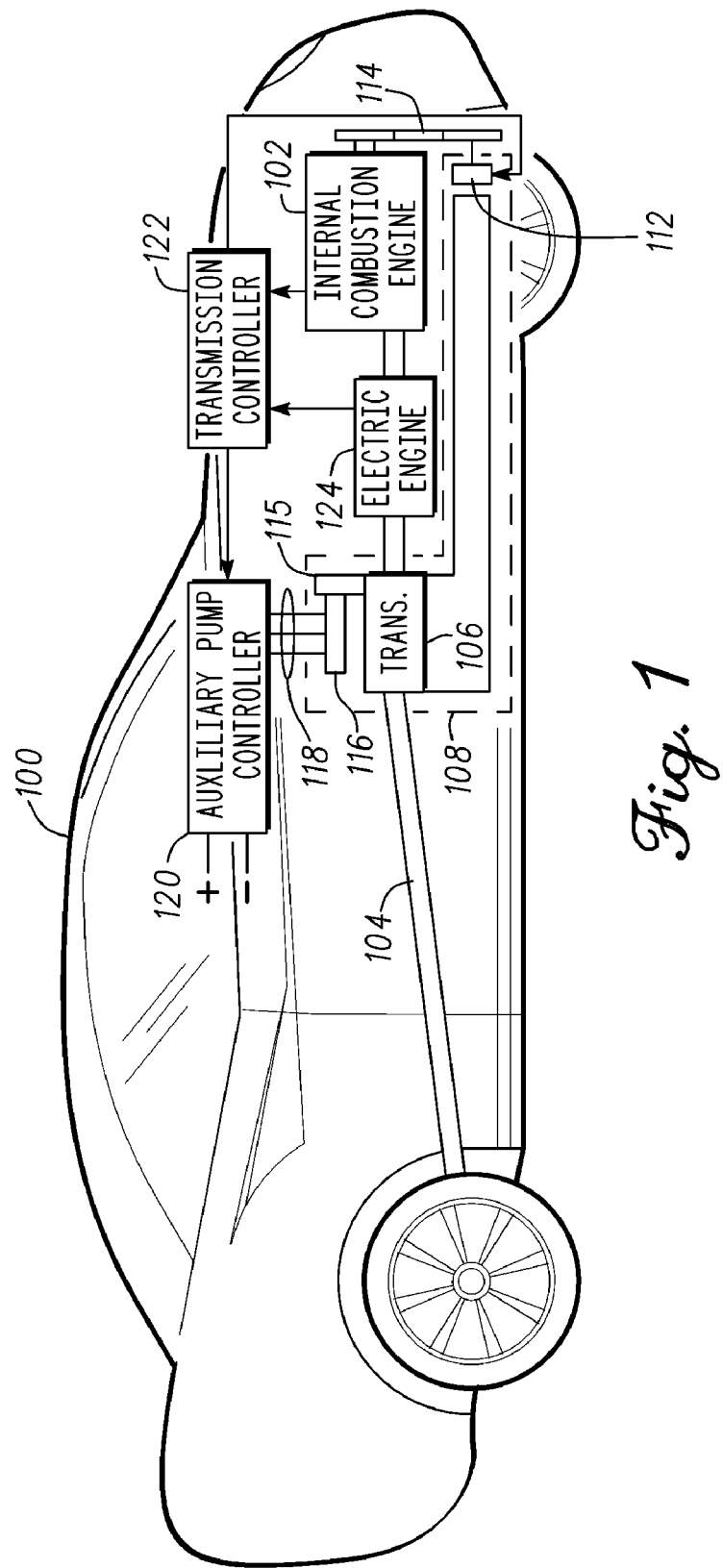
FIG. 1 illustrates a diagram of a vehicle in accordance with an embodiment of the present invention.

Referring to FIG. 1, a vehicle 100 includes an internal combustion engine 102 coupled to a drive shaft 104 for propelling the vehicle 100. A transmission 106, typically composed of a plurality of gears, is coupled to the drive shaft for controlling the movement of the vehicle 100. Transmission fluid columns 108 are provided for establishing a hydraulic system for retaining transmission fluid 110 therein, the transmission 106 being submerged in the transmission fluid 110 within the transmission fluid columns 108.

A primary transmission fluid pump 112 is also submerged in the transmission fluid 110 within the transmission fluid columns 108 and controls the flow of the transmission fluid 110 through the transmission fluid columns 108 and around the transmission 106 for regulating the temperature of the transmission 106. The primary transmission fluid pump 112 establishes pressure within the hydraulic system to hold the clutches and circulates the transmission fluid 110 within the hydraulic system for providing both lubrication for the transmission 106 components and cooling for the transmission 106. The primary transmission fluid pump 112 is coupled to the internal combustion engine 102 and pumps the transmission fluid 110 in response to the angular movement of the internal combustion engine 102, the primary transmission fluid pump 112 being coupled to the internal combustion engine 102 by, for example, a belt and pulley system 114.

In accordance with the present embodiment, an auxiliary electric transmission fluid pump 115 is additionally submerged in the transmission fluid 110 within the transmission fluid columns 108 for alternately controlling the flow of the transmission fluid 110 through the transmission fluid columns 108 and around the transmission 106. A small number of phase wires 118 connect the auxiliary electric transmission fluid pump 115 to a control section 120 located outside the transmission fluid columns 108 which controls the operation of the auxiliary electric transmission fluid pump 115. The auxiliary electric transmission fluid pump 115 includes an electric motor 116 and may take the form of a fixed displacement pump wherein the electric motor 116 rotates an inner gear of an inner and outer gear gerotor configuration to move the transmission fluid 110 through the transmission fluid columns 108.

A transmission controller 122 is coupled to the primary transmission fluid pump 112 by, for example, a sensor to determine whether the primary transmission fluid pump 112 is operating. The transmission controller 122 is also coupled to the auxiliary electric transmission fluid pump 116 for activating and deactivating the auxiliary electric transmission fluid pump 116 in response to the primary transmission fluid pump 112 and/or the operation of the internal combustion engine 102.

The vehicle 100 is a hybrid vehicle including, in addition to the internal combustion engine 102, an electric engine 124 coupled to the internal combustion engine 102 via an engine controller (not shown) for sharing the function of propelling the vehicle 100. The transmission controller 122 is coupled to the internal combustion engine 102, the electric engine 124, the primary transmission fluid pump 112, and the auxiliary electric transmission fluid pump 116 for activating the auxiliary electric transmission fluid pump 116 when the internal combustion engine 102 is deactivated and deactivating the auxiliary electric transmission fluid pump 116 when the internal combustion engine 102 is activated.

Figure 2:
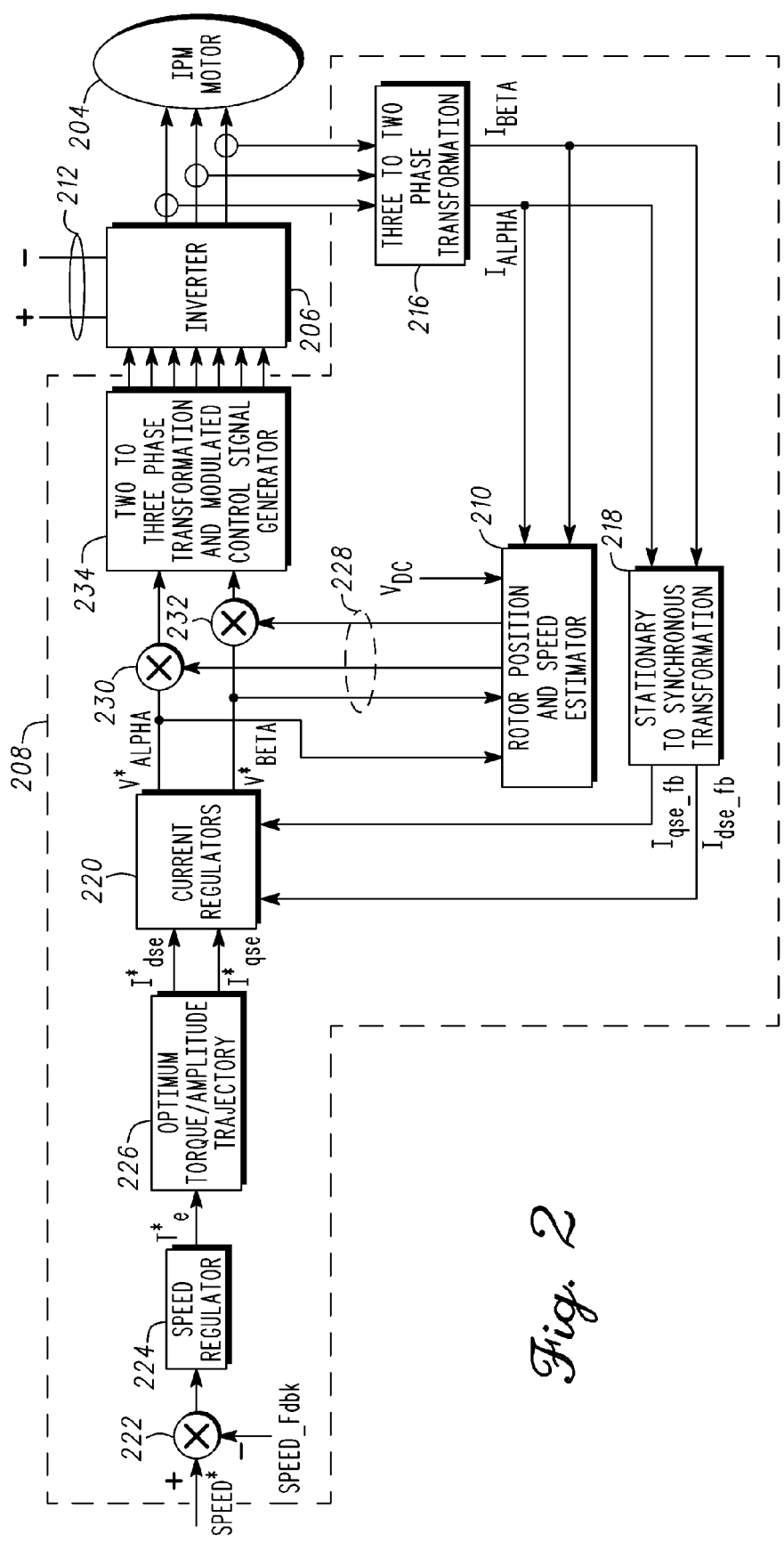
FIG. 2 illustrates a block diagram of an electric motor system for utilization as the auxiliary transmission pump electric motor system of the vehicle of FIG. 1 in accordance with the embodiment of the present invention.

Referring to FIG. 2, a block diagram of an electric motor system 202 in accordance with the present embodiment includes a three-phase synchronous permanent magnet motor 204 for operation as the auxiliary electric transmission fluid pump 116 under control of the control section 120. The control section 120 includes an inverter 206 and a controller 208, the controller 208 including a sensorless position and speed estimator 210.

The inverter 206 is coupled to a direct current (DC) source 212 and generates a plurality of phase signals in response to modulated control signals 214 received from the controller 208 coupled thereto. The number of phase signals corresponds to the number of phases of the permanent magnet motor 204 which, in the present embodiment, includes three phases. The inverter is coupled to the permanent magnet motor 204 and provides the plurality of phase signals on the phase wires 118 for controlling the operation of the permanent magnet motor 204.

The controller 208 is coupled to the inverter 206 and generates the modulated control signals 214 in response to a sensorless position signal, a sensorless speed signal, a speed command signal, and phase current signals, the controller 208 providing the modulated control signals 214 to the inverter for generation of the plurality of phase signals. The phase current signals are generated by sensing currents on two or more of the plurality of phase signals. The phase current signals are generated by sensing currents on the three phase wires 118, the phase current signals being provided to a three to two transformation module 216 which converts the three phase current signals to equivalent two phase stationary frame alpha/beta currents, $I_\alpha$ and $I_\beta$. The two phase alpha/beta currents, $I_\alpha$ and $I_\beta$, are provided to the sensorless position and speed estimator 210 and to a stationary to synchronous transformation module 218. The stationary to synchronous transformation module 218 transforms the two phase alpha/beta currents $I_\alpha$ and $I_\beta$ to synchronous frame feedback currents, $I_{qse\_fb}$ and $I_{dse\_fb}$. The synchronous frame feedback currents, $I_{qse\_fb}$ and $I_{dse\_fb}$, are provided to current regulators 220 for generating stationary frame voltage commands, $V^*_\alpha$ and $V^*_\beta$.

Meanwhile, the speed command signal, Speed*, is provided from the transmission controller 122 (FIG. 1) to a summer 222 of the controller 208 which subtracts the sensorless speed signal, Speed_Fdbk, and provides the resultant command signal to a speed regulator module 224 which converts the command signal to a synchronous frame torque command signal, $T^*_e$. The torque command signal, $T^*_e$, is provided to an optimal torque command and optimal amplitude trajectory determination block 226 which generates two current commands in the synchronous reference frame, $I^*_{dse}$ and $I^*_{qse}$, for provision to the current regulators 220. Thus it can be seen that the stationary frame voltage commands, $V^*_\alpha$ and $V^*_\beta$, are generated by the current regulators 220 by combining the synchronous frame current commands, $I^*_{dse}$ and $I^*_{qse}$, with the synchronous frame feedback currents, $I_{qse\_fb}$ and $I_{dse\_fb}$, to obtain resultant voltage command signals and transforming the resultant voltage command signals to the stationary frame voltage commands, $V^*_\alpha$ and $V^*_\beta$, utilizing the rotor position signal from the rotor position and speed estimator 210. The stationary frame voltage commands, $V^*_\alpha$ and $V^*_\beta$, are combined with injected voltage commands, $V_{\alpha\_inject}$ and $V_{\beta\_inject}$ 228, at signal summers 230, 232 and the resultant voltage signals are provided to a two to three phase transformation and modulated control signal generator 234 which generates the modulated control signals for provision to switching elements of the inverter 206.

The sensorless position signal and the sensorless speed signal correspond to a position and speed of a rotor rotating within the permanent magnet motor 204 and are generated by the sensorless position and speed estimator 210 operating entirely in a torque-speed plane. In accordance with the present embodiment, the sensorless position and speed estimator 210 generates the sensorless position signal and the sensorless speed signal in the torque-speed plane in response to the stationary frame phase current signals, $I_\alpha$ and $I_\beta$, and the stationary frame voltage command signals, $V^*_\alpha$ and $V^*_\beta$, and a direct current voltage, $V_{DC}$.

Figure 3:
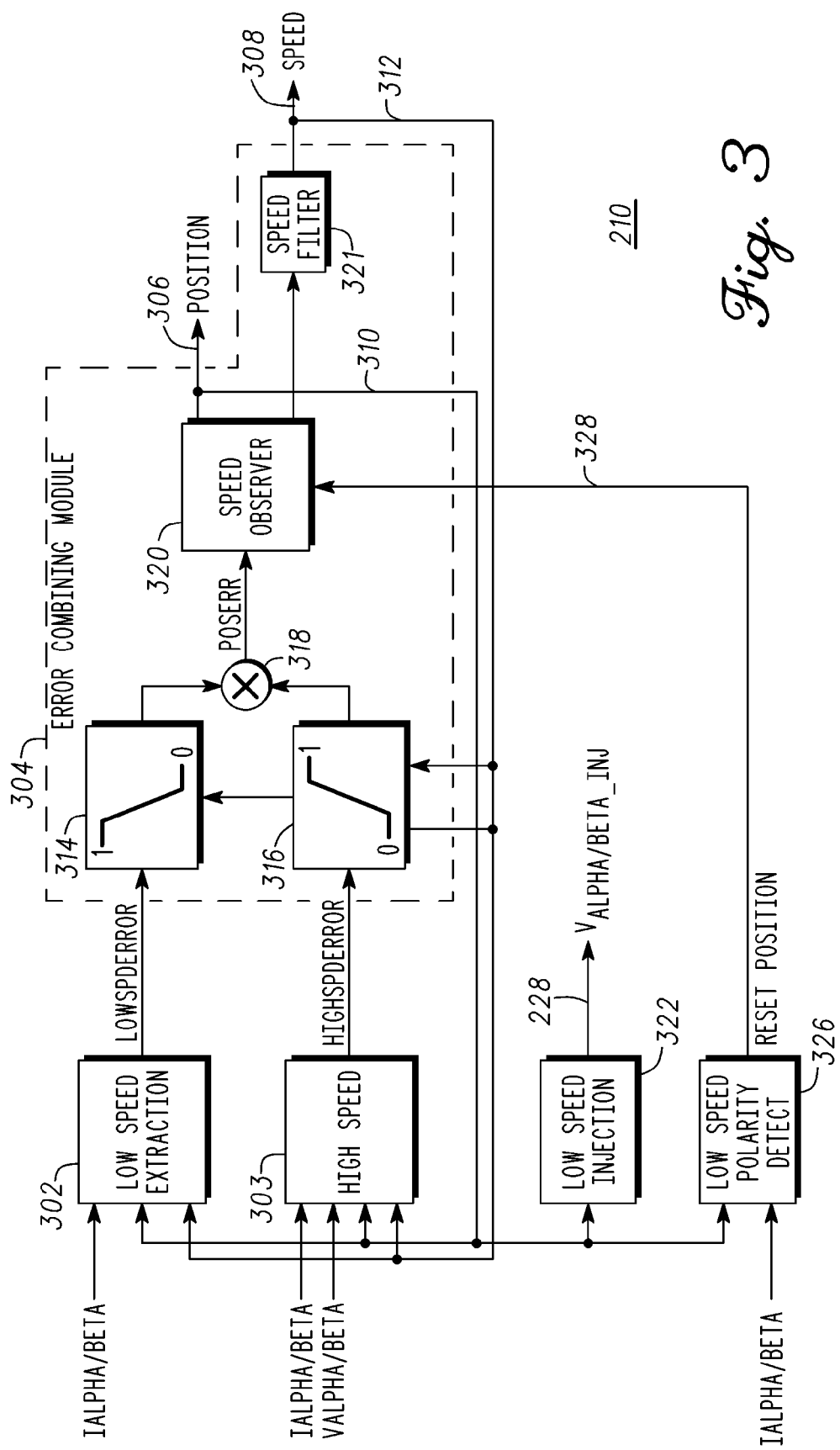
FIG. 3 illustrates a block diagram of a sensorless position and speed estimator of the electric motor system of FIG. 2 in accordance with the embodiment of the present invention.

Referring to FIG. 3, an exemplary structure of the sensorless position and speed estimator 210 is depicted. A low speed error extraction module 302 and a high speed error module 303 generate a low speed error signal and a high speed error signal, respectively. An error combining module 304 generates the sensorless position signal 306 and the sensorless speed signal 308 for providing to the controller 208 (FIG. 2) in response to the low speed error signal and the high speed error signal. A sensorless position feedback signal 310 is connected to the sensorless position signal 306, thereby being equivalent thereto. Likewise, a sensorless speed feedback signal 312 is connected to the sensorless speed signal 308.

The low speed error extraction module 302 determines the low speed error signal in response to the sensorless position feedback signal 310, the sensorless speed feedback signal 312 and the two phase currents ($I_{alpha/beta}$). In a similar manner, the high speed error module 303 determines the high speed error signal in response to the sensorless position feedback signal 310, the sensorless speed feedback signal 312, the two phase currents ($I_{alpha/beta}$), and the two of the phase voltages ($V_{alpha/beta}$).

The error combining module 304 includes a low speed error phase out module 314 and a high speed error phase in module 316 for providing a smooth transition from low speed sensorless operation to high speed sensorless operation. The low speed error phase out module 314 receives the low speed error signal and the sensorless speed feedback signal to calculate a low speed error component value by phasing out the low speed error signal as the speed of the vehicle increases in response to the sensorless speed feedback signal and a predetermined phase-out coefficient. Similarly, the high speed error phase in module 316 receives the high speed error signal and the sensorless speed feedback signal to calculate a high speed error component value by phasing in the high speed error signal as the speed of the vehicle increases in response to the sensorless speed feedback signal and a predetermined phase-in coefficient. The predetermined phase-out coefficient is selected so that the low speed error component value is equal to the low speed error signal at near zero speeds and smoothly phases out (e.g., straight-line phase out) to where the low speed error component value is zero when the speed reaches a predetermined low-to-high-speed transition speed. In a like manner, the predetermined phase-in signal is selected so that the high speed error component value is equal to zero at near zero speeds and smoothly phases in (e.g., a straight-line phase in) to where the high speed error component value is equal to the high speed error signal when the speed reaches or exceeds the predetermined low-to-high-speed transition speed. An error signal summer 318 combines the low speed error component value and the high speed error component value to generate a rotor error position signal. A speed observer module 320 receives the rotor position error signal and, in response thereto, calculates the sensorless position signal 306 and an observed speed signal, the observed speed signal being filtered by a speed filter 321 to generate the sensorless speed signal 308.

When the sensorless position feedback signal 310 has a near-zero value, the low speed injection module 322 generates a predetermined low speed injection signal ($V_{alpha/beta\_inj}$) for injecting a high frequency signal into a flux axis of the motor 204 at low speeds and provides the predetermined low speed injection signal as voltage signals 228 to the signal summers 230, 232 (FIG. 2) for combining with the synchronous frame voltage command signals, $V^*_\alpha$ and $V^*_\beta$. The high frequency signal is injected into the flux axis of the motor 204 at low speeds to generate the sensorless speed feedback signal 312 and the sensorless position feedback signal 310 at the low speeds.

A low speed polarity detector 326 compares the low speed error determined in response to the sensorless position feedback signal 310 to the two phase currents ($I_{alpha/beta}$). When the initial rotor position information is determined by the sensorless rotor position and speed estimator 210, it is imperative to differentiate between the positive and negative D axis (i.e., the rotor magnet north and south poles). The low speed polarity detector 326 determines from the low speed error and the two phase currents ($I_{alpha/beta}$) whether the sensorless rotor position signal is properly aligned with the rotor north pole. If the sensorless rotor position signal is not properly aligned with the rotor north pole, a reset position signal 324 is provided to the speed observer module 320. In response to the reset position signal 324, the speed observer module 320 switches the polarity of the sensorless rotor position signal so that the position signal 306 is correctly aligned with the rotor position.

Figure 4:
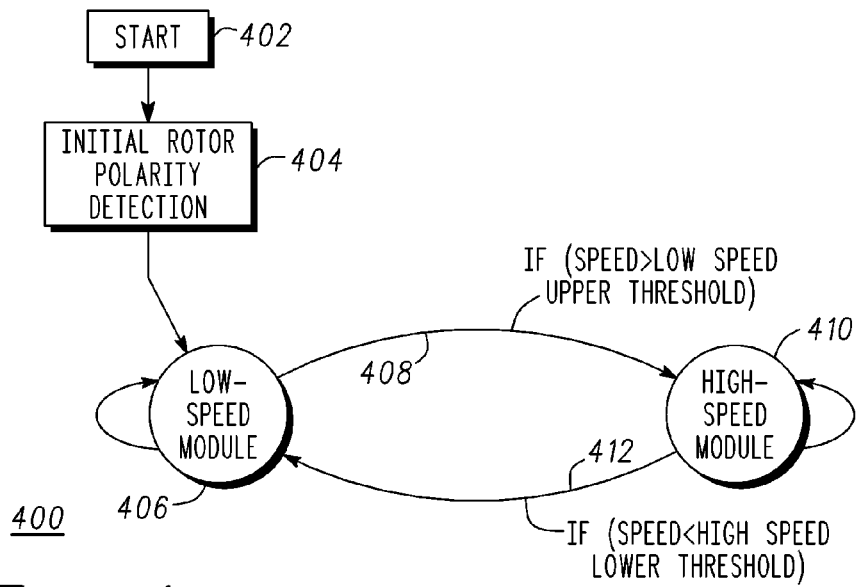
FIG. 4 illustrates modal operation of the sensorless position and speed estimator of FIG. 3 in accordance with the embodiment of the present invention.

In this manner, the sensorless position and speed estimator 210 provides the sensorless position signal 306 and the sensorless speed signal 308 as feedback signals at both low and high speeds. Particularly, the error combining module 304, including the low speed error phase out module 314 and the high speed error phase in module 316, provides a smooth transition from low speed sensorless operation to high speed sensorless operation. Referring to FIG. 4, a modal operation diagram 400 depicts operation of the sensorless position and speed estimator 210. At startup 402, as described above, the low speed injection module 322 initiates the calculation of the sensorless position signal 306 and the sensorless speed signal 308. Next, the low speed polarity detect module 326 performs the initial polarity detection 404 and corrects the polarity of the sensorless position signal 306, if necessary. Operation of the sensorless position and speed estimator 210 then proceeds in accordance with a low speed mode 406 as determined by the low speed extraction module 302.

Operation in accordance with the low speed mode 406 continues until the speed exceeds a low speed upper threshold. When the speed exceeds the low speed upper threshold, operation of the sensorless position and speed estimator 210 operates in a transition mode 408, transitioning from the low speed mode 406 to a high speed mode 410. Operation in accordance with the high speed mode 410 continues until the speed falls below a high speed lower threshold, at which point the operation of the sensorless position and speed estimator 210 operates in a transition mode 412, transitioning from the high speed mode 410 to the low speed mode 406.

Figure 5:
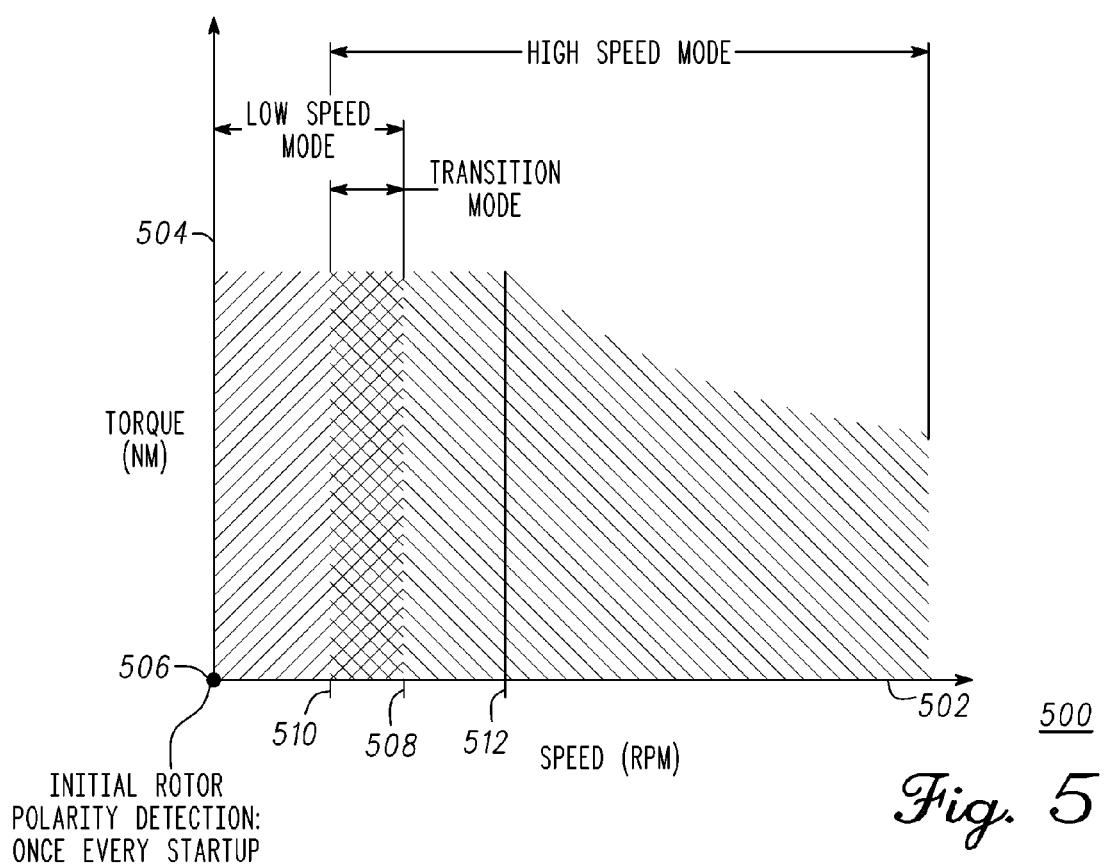
FIG. 5 illustrates a graph of the mode transition of the sensorless position and speed estimator of FIG. 3 in accordance with the embodiment of the present invention.

Referring to FIG. 5, the modal operation of the sensorless position and speed estimator 210 is depicted in the torque-speed plane in graph 500, where the sensorless speed in revolutions per minute is plotted on the x-axis 502 and the torque in Newton-meters is plotted on the y-axis 504. The initial rotor polarity detection 404 is performed once every startup as noted. Operation in the low speed mode 406 occurs between zero speed 506 and the low speed upper threshold 508. Operation in the high speed mode 410 occurs above the high speed lower threshold 510. Between the high speed lower threshold 510 and the low speed upper threshold 508, the sensorless position and speed estimator 210 operates in a transition area in accordance with one of transition modes 408 or 412.

It can be seen from the graph 500 that a constant torque is advantageously provided in the low speed mode 406 and the transition modes 408 and 412 in accordance with the present embodiment. In the high speed mode 410, the constant torque is provided as the speed increases until the speed exceeds speed 512. Above speed 512, the torque decreases as a function of speed.

Figure 6:
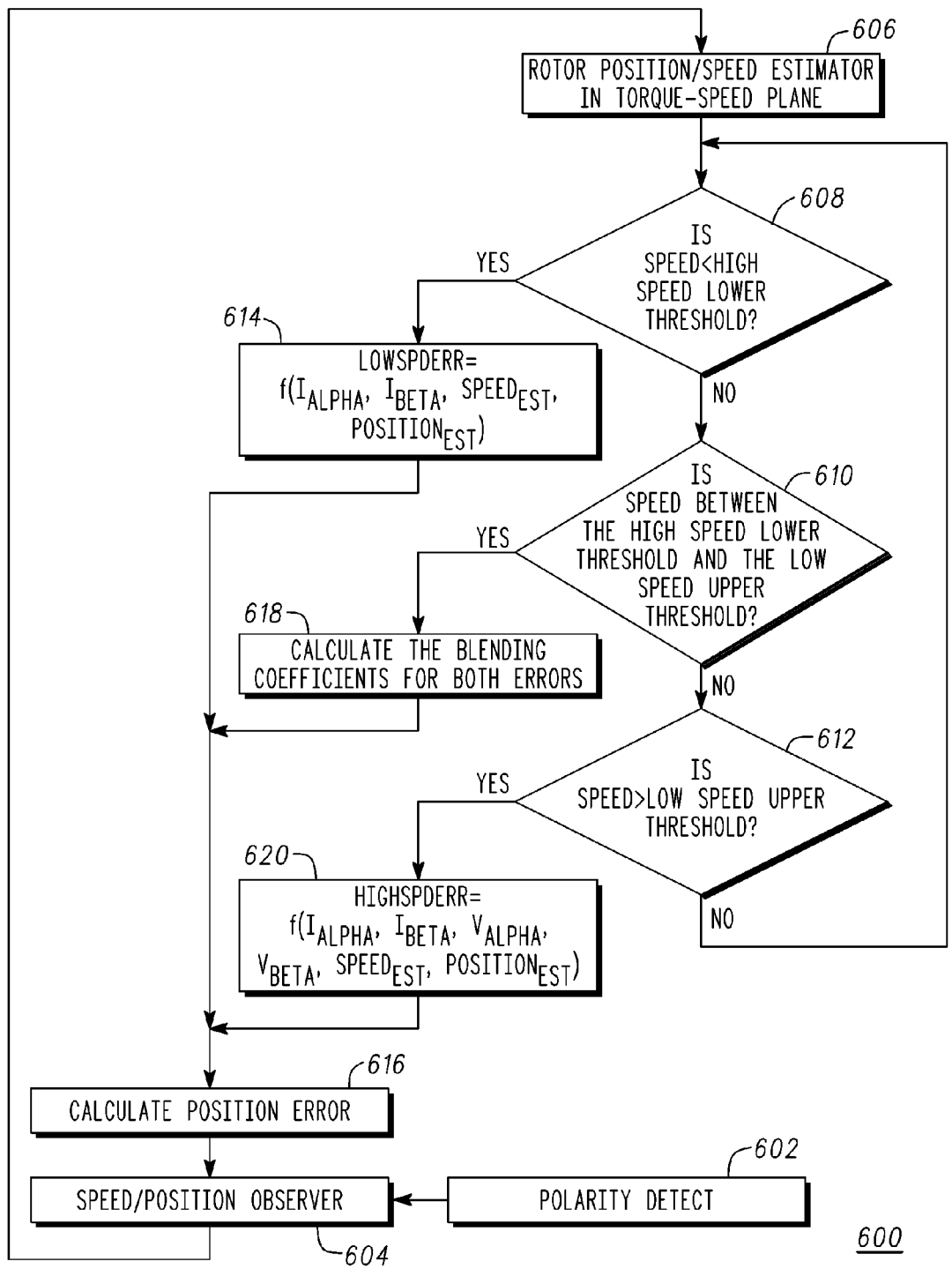
FIG. 6 illustrates a flowchart of the operation of the sensorless position and speed estimator of FIG. 3 in accordance with the embodiment of the present invention.

While an exemplary construction of the sensorless position and speed estimator 210 has been depicted in FIG. 3 resulting in the operation depicted in the modal operation diagram 400 and the graph 500, those skilled in the art will realize that a sensorless position and speed estimator 210 which calculates a sensorless speed signal and a sensorless position signal entirely in the torque-speed plane can be constructed in any one of a number of other ways. For example, the phase current signal ($I_{alpha/beta}$) can be digitized and the calculation of the sensorless position signal and the sensorless speed signal can be enabled in software. Accordingly, FIG. 6 depicts a flowchart 600 of the operation of the sensorless position and speed estimator 210 performing sensorless position and speed estimation in the torque-speed plane in accordance with the present embodiment.

Initially, the polarity detect operation 602 is performed at startup to assure at the speed/position observer 604 that the polarity of the sensorless rotor position signal is consistent with the polarity of the rotor position. Then sensorless position and speed estimation 606 is performed in the torque-speed plane. Processing next determines (a) whether the estimated sensorless speed is less than the high speed lower threshold 608, (b) whether the estimated sensorless speed is between the high speed lower threshold and the low speed upper threshold 610, or (c) whether the estimated sensorless speed is higher than the low speed upper threshold 612.

When the estimated sensorless speed value is less than the high speed lower threshold 608, the sensorless low speed error is calculated 614 as a function of the two phase alpha/beta currents, $I_\alpha$ and $I_\beta$, and the estimated sensorless position and speed. The sensorless position error is calculated 616 from the sensorless speed and the speed/position observer step 604 provides the sensorless speed and position as feedback quantities for the operation of the sensorless controller 210. Processing then returns to step 606 to re-estimate the sensorless position and speed values.

When the estimated sensorless speed value is between the high speed lower threshold and the low speed upper threshold 610, the transition speed error value is calculated 618 as a function of the sensorless low speed error and the sensorless high speed error, using the blending coefficients of the error combining module 304 (FIG. 3) to combine both error values at step 618. The low speed error component value is calculated by multiplying the low speed error value by a predetermined phase-out coefficient selected to smoothly transition out the low speed error between the high speed lower threshold and the low speed upper threshold. The predetermined phase-out coefficient is a function of the sensorless speed feedback signal such as Equation 1:

$$(TransitionSpeed - SensorlessSpeed)/TransitionSpeed \qquad (1)$$

where TransitionSpeed is the difference between the low speed upper threshold and the high speed lower threshold. The high speed error component value is calculated by multiplying the high speed error value by a predetermined phase-in coefficient selected to smoothly transition in the high speed error between zero speed and the predetermined transition speed. The predetermined phase-in coefficient is also a function of the sensorless speed feedback signal such as Equation 2:

$$SensorlessSpeed/TransitionSpeed \qquad (2)$$

The low speed error component value is combined with the high speed error component value to obtain the transition speed error value 618. Processing then continues by calculating 616 the rotor position error value from the transition speed error value and the speed/position observer step 604 provides the sensorless speed and position as feedback quantities for the operation of the sensorless controller 210. Processing then returns to step 606 to re-estimate the sensorless position and speed values.

When the estimated sensorless speed value is higher than the low speed upper threshold 612, the sensorless high speed error is calculated 620 as a function of the two phase alpha/beta currents, $I_\alpha$ and $I_\beta$, the two phase stationary frame alpha/beta voltages, $V_\alpha$ and $V_\beta$, and the estimated sensorless position and speed. The sensorless position error signal is then calculated 616 from the sensorless speed error signal and the speed/position observer step 604 provides the sensorless speed and position as feedback quantities for the operation of the sensorless controller 210. Processing then returns to Processing then returns to step 606 to re-estimate the sensorless position and speed values.

Figure 7:
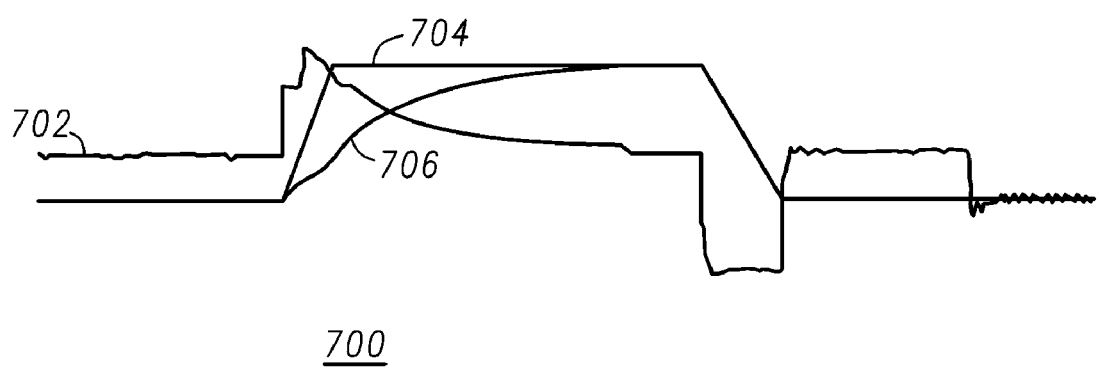
FIG. 7 illustrates a graph of the operation of the electric motor system of FIG. 2 during low speed operation, high speed operation, and transitioning from the low speed to the high speed operation in accordance with the embodiment of the present invention.

Referring to FIG. 7, a graph 700 traces torque values 702 and speed values 704 in response to the motor speed values 706 for operation of the present embodiment. Those skilled in the art of the present invention will realize that the graph 700 shows excellent control wherein the present embodiment provides position and speed values sensorlessly in the torque-speed plane to generate a smooth transition in the resultant torque. Conventional rotor position and speed estimators may switch between low speed error generation and high speed error generation providing uneven motor speed values at transitional speeds. Operation in accordance with the present embodiment, however, provides a smooth curve 706 as motor speed values transition from low speed to high speed.

Accordingly, the present embodiment provides an implementation of an electric motor system 202 useful when the motor is a pump submerged in a liquid or subject to some other environmental condition which would make use of a resolver expensive, difficult or both. Thus, it can be seen that a robust and cost effective method and apparatus for sensorless operation of a permanent magnet synchronous motor in an electric motor system has been described herein. The electric motor system of the present embodiment is particularly suitable for utilization as an auxiliary transmission pump motor system by reducing the number of wires connected to the motor which is submerged in the transmission fluid.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for sensorless control of a permanent magnet motor comprising a plurality of phases, the method comprising the step of determining a sensorless position signal and a sensorless speed signal in a torque-speed plane in response to phase currents corresponding to currents on one or more of the plurality of phases, wherein the step of determining a sensorless position signal and a sensorless speed signal comprises the steps of:

determining a low speed error signal in response to a difference in the phase currents, a sensorless position feedback signal, and a sensorless speed feedback signal;

determining a high speed error signal in response to the difference in the phase currents, the position feedback signal, and the speed feedback signal; and determining a sensorless position signal and a sensorless speed signal in response to the high speed error signal and the low speed error signal, wherein the sensorless position feedback signal is equivalent to the sensorless position signal and the sensorless speed feedback signal is equivalent to the sensorless speed signal.

2. The method in accordance with claim 1 wherein the step of determining the high speed error signal comprises the step of determining the high speed error signal in response to the difference in the phase currents, a difference in phase voltages, the position feedback signal, and the speed feedback signal, wherein the phase voltages correspond to voltages on the one or more of the plurality of phases.

3. The method in accordance with claim 1 further comprising the steps of:

determining a low speed error component value in response to the low speed error signal and the sensorless speed feedback signal;

determining a high speed error component value in response to the high speed error signal and the sensorless speed feedback signal, wherein the step of determining the sensorless position signal and the sensorless speed signal comprises the step of combining the low speed error component signal and the high speed error component signal to generate a rotor position error signal, the sensorless position signal and the sensorless speed signal being determined in response to the rotor position error signal.

4. The method in accordance with claim 1 further comprising the step of generating a low speed injection signal in response to the sensorless position signal, wherein the difference in the phase currents is determined in response to the low speed injection signal.

5. The method in accordance with claim 1 further comprising the step of determining a reset position signal in response to the sensorless position feedback signal and the difference in the phase currents, wherein the step of determining the sensorless position signal and the sensorless speed signal comprises the step of determining the sensorless position signal and the sensorless speed signal in response to the high speed error signal, the low speed error signal, and the reset position signal.

6. The method in accordance with claim 5 wherein the step of determining the sensorless position signal and the sensorless speed signal comprises the steps of:

determining the sensorless position signal and an observed speed signal in response to the high speed error signal, the low speed error signal, and the reset position signal; and filtering the observed speed signal to generate the sensorless speed signal.

* * * * *